(12) United States Patent
Triplett

(10) Patent No.: US 11,550,702 B1
(45) Date of Patent: Jan. 10, 2023

(54) ENSURING THAT COMPUTER PROGRAMS ARE ACCESSIBLE TO USERS WITH DISABILITIES, SUCH AS FOR USE WITH MOBILE PHONES

(71) Applicant: T-Mobile USA, Inc., Bellevue, WA (US)

(72) Inventor: Charles Roy Triplett, Mercer Island, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/519,466

(22) Filed: Nov. 4, 2021

(51) Int. Cl.
  G06F 11/36 (2006.01)
  G06F 3/0482 (2013.01)
  G06F 40/14 (2020.01)
  G06F 3/04883 (2022.01)
  G06F 3/0489 (2022.01)
  H04M 1/72469 (2021.01)
  G06F 9/451 (2018.01)
  G10L 15/18 (2013.01)
  (Continued)

(52) U.S. Cl.
  CPC ........ *G06F 11/3676* (2013.01); *G06F 3/0482* (2013.01); *G06F 3/0489* (2013.01); *G06F 3/04883* (2013.01); *G06F 9/451* (2018.02); *G06F 11/3664* (2013.01); *G06F 11/3688* (2013.01); *G06F 40/14* (2020.01); *G10L 15/18* (2013.01); *H04M 1/72469* (2021.01); *G09B 21/003* (2013.01); *G09B 21/04* (2013.01)

(58) Field of Classification Search
  CPC .............. G06F 11/3676; G06F 3/0482; G06F 3/04883; G06F 3/0489; G06F 9/451; G06F 11/3664; G06F 11/3688; G06F 40/14; G10L 15/18; H04M 1/72469; G09B 21/003; G09B 21/04
  See application file for complete search history.

(56) References Cited

U.S. PATENT DOCUMENTS

| | | |
|---|---|---|
| 6,314,410 B1 | 11/2001 | Tackett et al. |
| 6,604,090 B1 | 8/2003 | Tackett et al. |
| (Continued) | | |

FOREIGN PATENT DOCUMENTS

| | | |
|---|---|---|
| CN | 109074382 A | 12/2018 |
| CN | 105580002 B | 1/2019 |
| (Continued) | | |

*Primary Examiner* — Jennifer N Welch
*Assistant Examiner* — Kc Chen
(74) *Attorney, Agent, or Firm* — Perkins Coie LLP

(57) ABSTRACT

Disclosed here is a system to enable interaction between a user with a disability and a computer program. The system can obtain a representation of a user interface to present to a user. The system can determine an element associated with the user interface, where the element is configured to provide information to the user, however, the user interface presentation of the element at least partially fails to provide the information to the user. Based on the element, the system can determine an appropriate test to perform. The appropriate test indicates at least two of: a test to perform with a keyboard, a gesture test to perform with a mobile screen reader, and an audio test to perform with a screen reader. The system can generate an indication of the appropriate test. The system can provide the indication of the appropriate test prior to releasing the user interface to the user.

18 Claims, 7 Drawing Sheets

(51) Int. Cl.
*G09B 21/04* (2006.01)
*G09B 21/00* (2006.01)

(56) References Cited

U.S. PATENT DOCUMENTS

| | | | |
|---|---|---|---|
| 6,707,474 B1* | 3/2004 | Beck | G06F 11/25 |
| | | | 702/68 |
| 7,529,763 B2 | 5/2009 | Hulse et al. | |
| 7,565,270 B2 | 7/2009 | Bramwell et al. | |
| 7,644,367 B2* | 1/2010 | McKeon | H04N 21/4431 |
| | | | 715/762 |
| 7,716,571 B2 | 5/2010 | Tien et al. | |
| 7,774,383 B2 | 8/2010 | Acevedo-aviles et al. | |
| 7,974,940 B2 | 7/2011 | Ayloo | |
| 8,096,657 B2 | 1/2012 | Pompilio et al. | |
| 8,190,992 B2 | 5/2012 | Tien et al. | |
| 8,429,002 B2 | 4/2013 | Chandra | |
| 8,463,760 B2 | 6/2013 | Himstedt et al. | |
| 8,566,746 B2 | 10/2013 | Chuat et al. | |
| 8,612,806 B2 | 12/2013 | Rossi | |
| 8,661,432 B2 | 2/2014 | Kriebel et al. | |
| 8,762,886 B2 | 6/2014 | Lietzke et al. | |
| 8,782,470 B2 | 7/2014 | Neumueller et al. | |
| 9,262,646 B1 | 2/2016 | Yeo | |
| 9,268,671 B2 | 2/2016 | Chea et al. | |
| 9,477,985 B2 | 10/2016 | Poon | |
| 9,536,101 B1 | 1/2017 | Demov et al. | |
| 10,019,486 B2 | 7/2018 | Kephart et al. | |
| 10,203,933 B2 | 2/2019 | Yang et al. | |
| 10,223,224 B1 | 3/2019 | Hickey et al. | |
| 10,241,903 B1 | 3/2019 | Mody et al. | |
| 10,423,999 B1 | 9/2019 | Doctor et al. | |
| 10,524,021 B2 | 12/2019 | Heilbron et al. | |
| 10,713,964 B1 | 7/2020 | Shammout | |
| 10,747,890 B2 | 8/2020 | Yablokov et al. | |
| 10,762,390 B2 | 9/2020 | Can et al. | |
| 10,831,511 B2 | 11/2020 | Morey et al. | |
| 10,977,435 B2 | 4/2021 | Convertino et al. | |
| 10,989,757 B2 | 4/2021 | Venkataraman et al. | |
| 11,004,541 B1 | 5/2021 | Shelley et al. | |
| 11,010,703 B2 | 5/2021 | Balugari et al. | |
| 11,023,673 B2 | 6/2021 | Dwane | |
| 2003/0177048 A1 | 9/2003 | Jacobson | |
| 2006/0101415 A1 | 5/2006 | Evans et al. | |
| 2006/0129417 A1 | 6/2006 | Williams et al. | |
| 2007/0067268 A1 | 3/2007 | Dai et al. | |
| 2007/0124201 A1 | 5/2007 | Hu et al. | |
| 2009/0100380 A1 | 4/2009 | Gardner et al. | |
| 2009/0307726 A1 | 12/2009 | Levin et al. | |
| 2011/0246878 A1 | 10/2011 | Dowdell | |
| 2012/0072823 A1* | 3/2012 | Lau | G06F 40/143 |
| | | | 717/115 |
| 2014/0324438 A1* | 10/2014 | Hofstader | G10L 13/00 |
| | | | 704/260 |
| 2014/0351796 A1* | 11/2014 | Gur-esh | G06F 11/3644 |
| | | | 717/126 |
| 2015/0193091 A1* | 7/2015 | Cragun | G06F 8/77 |
| | | | 715/763 |
| 2015/0350147 A1 | 12/2015 | Shepherd et al. | |
| 2016/0026727 A1 | 1/2016 | Bar-yossef et al. | |
| 2017/0139564 A1* | 5/2017 | Belekar | G06F 3/0484 |
| 2017/0270437 A1 | 9/2017 | Johnstone et al. | |
| 2018/0077189 A1 | 3/2018 | Doppke et al. | |
| 2019/0361575 A1 | 11/2019 | Ni et al. | |
| 2020/0121236 A1 | 4/2020 | Gao et al. | |
| 2021/0264059 A1 | 8/2021 | Ivanov | |
| 2021/0392144 A1* | 12/2021 | Vaidyanath | G06F 16/285 |
| 2022/0164278 A1* | 5/2022 | Coffin | G10L 15/08 |

FOREIGN PATENT DOCUMENTS

| | | |
|---|---|---|
| CN | 111845771 A | 10/2020 |
| CN | 111949240 A | 11/2020 |
| CN | 112083985 A | 12/2020 |
| CN | 112368778 A | 2/2021 |
| EP | 1008019 A1 | 6/2000 |
| EP | 1229822 A2 | 8/2002 |
| EP | 2019362 A2 | 1/2009 |
| EP | 2304667 A1 | 4/2011 |
| EP | 3022720 A1 | 5/2016 |
| EP | 3283950 A2 | 2/2018 |
| EP | 3867782 A1 | 8/2021 |
| JP | 6588033 B2 | 9/2019 |
| KR | 20120095299 A | 8/2012 |
| WO | 0073968 A1 | 12/2000 |
| WO | 2004006092 A2 | 1/2004 |
| WO | 2012104481 A1 | 8/2012 |
| WO | 2016073907 A1 | 5/2016 |
| WO | 2016197058 A1 | 12/2016 |
| WO | 2017117254 A1 | 7/2017 |
| WO | 2017156399 A1 | 9/2017 |
| WO | 2018119322 A1 | 6/2018 |
| WO | 2020190485 A1 | 9/2020 |
| WO | 2020197694 A1 | 10/2020 |

* cited by examiner

300

Controls ▲

- Button
- Captcha
- Carousel
- Checkbox
- Link
- Menu
- Pagination control
- Picker / Spinner / Dropdown
- Radio button
- Range slider
- Segmented Control / Tab
- Stepper
- Table row button
- Text input
- Toggle switch

310

Notifications ▲

- Alert / Modal Dialog
- Toast snackbar banner

ENSURING THAT COMPUTER PROGRAMS ARE ACCESSIBLE TO USERS WITH DISABILITIES, SUCH AS FOR USE WITH MOBILE PHONES

BACKGROUND

The internet strives to operate as an inclusive place. However, those with disabilities may still have difficulty finding websites and information online because most user interfaces are targeted toward users who can see, hear, and use a keyboard and mouse.

BRIEF DESCRIPTION OF THE DRAWINGS

Detailed descriptions of implementations of the present invention will be described and explained through the use of the accompanying drawings.

FIG. 3 shows user interface categories associated with a native application.

FIGS. 4A-4B show selection of an appropriate test.

Figure 1:
FIG. 1 shows a user interface to generate an indication of an appropriate test to perform to ensure that a user interface provides intended information to a large set of users, including users with disabilities.
Figure 1:
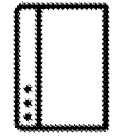

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to allow users with a disability to interact with computer programs. To ensure that the computer programs are accessible to users with a disability, prior to releasing the computer program, the system generates an indication of an appropriate test to perform to ensure that a user interface can provide intended information even to a user with a disability. The system can obtain a representation of the user interface to present to a user. The representation can be a design document describing the user interface, a sketch of the user interface, or a functioning user interface. The user interface can be a graphical user interface, an audio interface, or a haptic user interface. The system can identify an element associated with the user interface, such as a menu, a button, a link, etc., where the element is configured to provide information to the user, however, the user interface presentation of the element at least partially fails to provide the information to the user, due to the user's particular disability or severity of that disability.

Based on the element, the system can determine an appropriate test to perform, where the appropriate test indicates a test to perform with a keyboard, a gesture test to perform with a mobile screen reader (e.g. TalkBack or VoiceOver), and/or an audio test to perform with a screen reader. The system can generate the indication of the appropriate test. For example, when the appropriate test includes the test to perform with the keyboard, the system can indicate a keyboard key and an effect caused by activating the keyboard key. When the appropriate test includes the gesture test, the system can indicate a gesture and an effect caused by performing the gesture. When the appropriate test includes the audio test, the system can indicate audio and a function to be performed by the audio. The system can provide the presentation prior to releasing the user interface to the user, to ensure that the appropriate tests are performed.

A screen reader is a form of assistive technology (AT) that renders text and image content as speech or haptic output, e.g. braille output. A refreshable braille display or braille terminal is an electro-mechanical device for displaying characters, usually by means of round-tipped pins raised through holes in a flat surface. Visually impaired computer users who cannot use a standard computer monitor can use it to read text output. Deafblind computer users may also use refreshable braille displays. Speech synthesizers are also commonly used for the same task, and a blind user may switch between the two systems or use both at the same time depending on circumstances.

Screen readers are essential to people who are blind, and are useful to people who are visually impaired, illiterate, or have a learning disability. Screen readers are software applications that attempt to convey what people with normal eyesight see on a display to their users via non-visual means, like text-to-speech, sound icons, or a Braille device. They do this by applying a wide variety of techniques that include, for example, interacting with dedicated accessibility APIs, using various operating system features (like inter-process communication and querying user interface properties), and employing hooking techniques.

In computer programming, the term hooking covers a range of techniques used to alter or augment the behavior of an operating system, of applications, or of other software components by intercepting function calls or messages or events passed between software components. Code that handles such intercepted function calls, events or messages is called a hook. Examples of hooking can include intercepting an output from an application sent to the display, to add audio or Braille indications of the output.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Ensuring that Computer Programs are Accessible to Users with a Disability

FIG. 1 shows a user interface to generate an indication of an appropriate test to perform to ensure that a user interface provides intended information to a large set of users, including users with disabilities. The user interface 100 enables a user to indicate the type of tests to perform on a program, to ensure that a program 110 is accessible to users with a disability. The users with a disability may not be able to use the mouse or the keyboard, or they may not be able to read due to blindness, limited literacy, or other reasons.

The program 110 can include web programs, such as web pages 110A or native applications 110B. The native applications 110B can be associated with various devices such as mobile phones, computers, tablets, wearable devices, etc. User interfaces of programs 110A, 110B can include graphical user interfaces, audio user interfaces, and/or haptic user interfaces.

Figure 2:
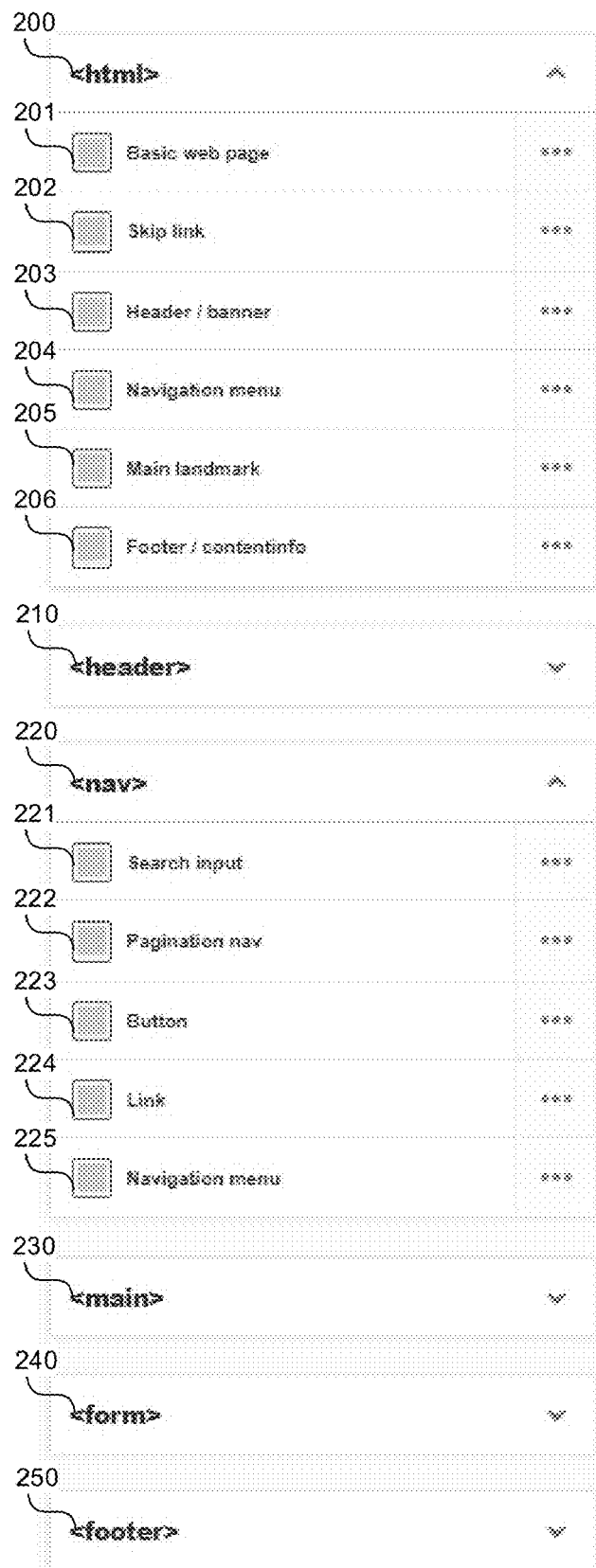
FIG. 2 shows user interface categories associated with a web page.

FIG. 2 shows user interface categories associated with the web page. A hardware or software processor executing instructions described in this application can determine the type of program associated with the user interface, and based on the type of program can determine the multiple categories associated with user interface elements. When the program is a web page 110A in FIG. 1, the processor creates the following categories: HTML 200, header (or banner) 210, navigation 220, main 230, form 240, and footer (contentinfo) 250. Other categories can be included such as aside, article, section. The aside HTML element represents a portion of a document whose content is only indirectly related to the document's main content. Asides are frequently presented as sidebars or call-out boxes. The article HTML element represents a self-contained composition in a document, page, application, or site, which is intended to be independently distributable or reusable (e.g., in syndication). Examples include: a forum post, a magazine or newspaper article, or a blog entry, a product card, a user-submitted comment, an interactive widget or gadget, or any other independent item of content. The section element is a structural HTML element used to group together related elements. Each section typically includes one or more heading elements and additional elements presenting related content.

The HTML 200 element indicates that the document is an HTML document. HyperText Markup Language, or HTML, is the standard markup language for documents designed to be displayed in a web browser. The HTML 200 element can include user interface elements such as basic web page 201, skip link 202, header/banner 203, navigation menu 204, main landmark 205, and/or footer/content info 206.

The header 210 is a content sectioning element allowing organization of the document content into logical pieces. Header 210 represents introductory content, typically a group of introductory or navigational aids. Header 210 may contain some heading elements but also a logo, a search form, an author name, and other elements. The header 210 element can include user interface elements such as search input, header/banner, and/or navigation menu (not pictured).

The navigation 220 element represents a section of a page that serves the purpose of providing navigation links, either within the current document or to other documents. Common examples of navigation sections are menus, tables of contents, and indexes. The navigation 220 element can include user interface elements such as search input 221, pagination nav 222, button 223, link 224, and/or navigation menu 225.

The main 230 element represents the dominant content of the <body> of a document. The main content area consists of content that is directly related to or expands upon the central topic of a document, or the central functionality of an application. The main 230 element can include user interface elements such as: Alert; Animation; Expander accordion; Figure: map, chart, table; Heading: h1, h2, h3; Image: jpg, gif, png, svg; Modal Dialog; Separator/horizontal rule; Sticky element; Table; Toast Snackbar; Tooltip; Video/audio player; Pagination nav; Progress bar; Link; Carousel; and/or Main landmark (not pictured).

The form 240 element represents a document section containing interactive controls for submitting information. The form 240 element can include user interface elements such as: Alert; Checkbox; Date picker dialog; Dropdown listbox select; Hint, help, or error; Listbox with inline autocomplete; Number input; Password input; Radio button; Range slider input; Separator/horizontal rule; Star rating; Stepper input; Text input; Toast Snackbar; Toggle switch; Progress bar; and/or Button (not pictured).

The footer 250 element is a content sectioning element. The footer 250 element represents a footer for its nearest sectioning content or sectioning root element. A <footer> typically contains information about the author of the section, copyright data, or links to related documents. The footer 250 element can include user interface elements such as navigation menu and/or footer/content info (not pictured).

FIG. 3 shows user interface categories associated with a native application. A processor based on the type of program can determine the multiple categories associated with user interface elements. When the program is a native application 110B in FIG. 1, the processor creates the following categories: controls 300 and notifications 310. The processor chooses the categories so that user interface elements belonging to native applications running on various platforms such as Android and iOS can be categorized in the categories 300, 310. The processor can also create category specific to a particular platform such as iOS. Those categories can include bars and views.

Controls 300 are user interface elements that display content or enable interaction. Controls are the building blocks of the user interface. Controls 300 can include the following user elements: Button; Captcha; Carousel; Checkbox; Link; Menu; Pagination control; Picker/Spinner/Dropdown; Radio button; Range slider; Segmented Control/Tab; Stepper; Table row button; Text input; and/or Toggle switch.

The notifications 310 include Alert/Modal Dialog and/or Toast/snack bar/banner notification. Alert/Modal Dialog notifications interrupt users and demand an action. They are appropriate when a user's attention needs to be directed toward important information. Toast, snackbar, banner all refer to a graphical control element that communicates certain events to the user without forcing the user to react to this notification immediately, unlike conventional pop-up windows. Desktop notifications usually disappear automatically after a short amount of time. Often their content is then stored in some widget that allows the users to access past notifications at a more convenient time.

A bar can include a navigation bar, search bar, sidebar, status bar, tab bar, toolbar, etc. The bar can provide various information to the user or receive input from the user. The bar can be vertical, or horizontal on the screen.

A view represents a single item on the user interface. It could be a control such as a button or slider, an input text field, or perhaps an image. A view covers a specific area on the screen and can be configured to respond to touch events.

Figure 4A:
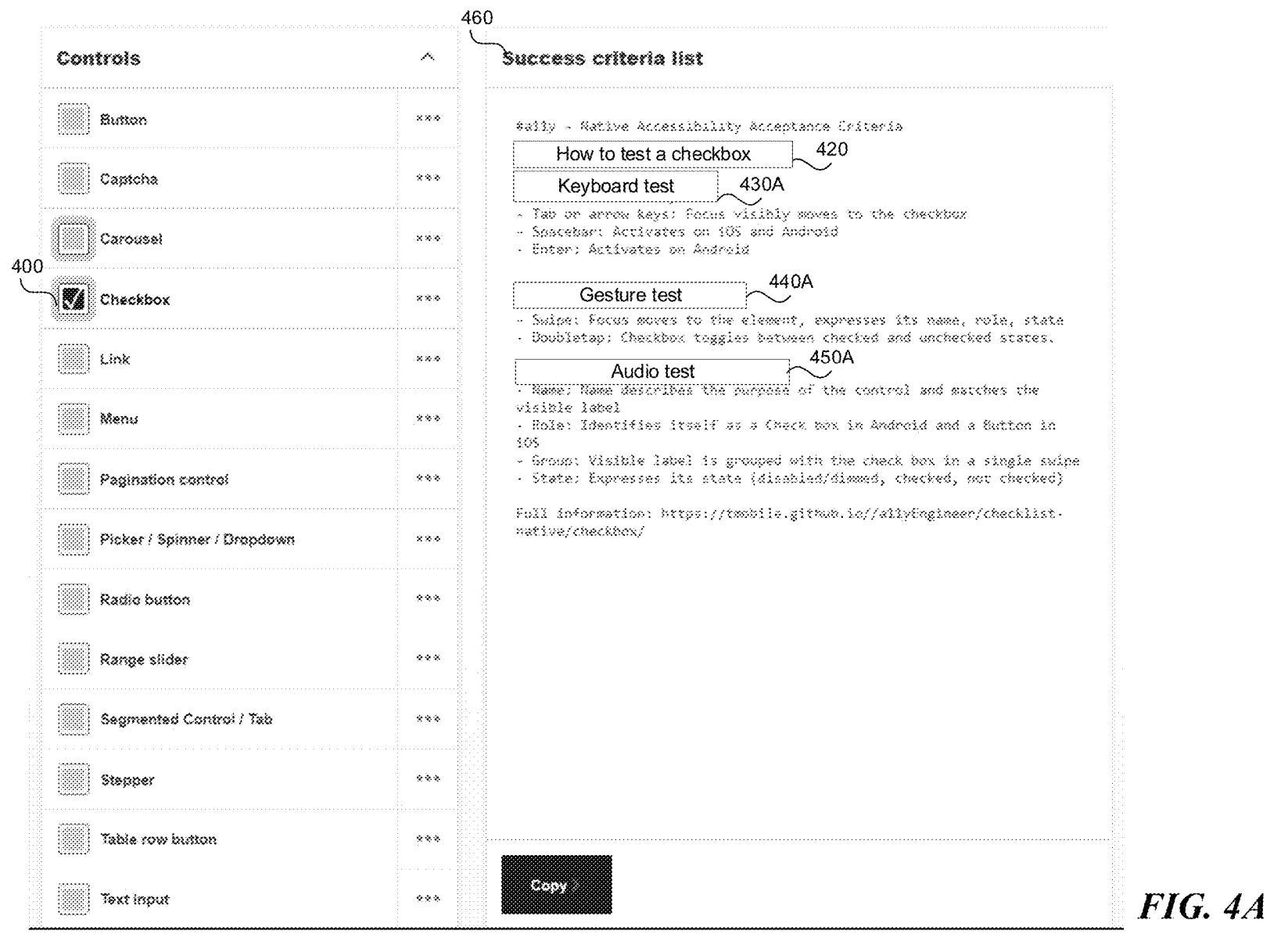
Figure 4B:

FIGS. 4A-4B show selection of an appropriate test. When the appropriate user interface element 400 shown in FIGS. 4A-4B, 410 shown in FIG. 4B (only 2 labeled for brevity) is selected, the processor can generate the presentation 460 including the indication 420 of the appropriate test. The processor can select the user interface elements 400, 410 by analyzing the user interface and determining the user interface elements 400, 410 included in the user interface. Alternatively, the user can manually select the user interface elements 400, 410.

The indication 420 of the appropriate test can be split into 3 categories: keyboard test 430A, gesture test 440A, and audio test 450A.

When the appropriate test includes the keyboard test 430A, the test indicates a keyboard key and an effect caused by activating the keyboard key. For example, for testing the user interface element checkbox, the test indicates:

1. Test with the Keyboard

Tab or arrow keys: Focus visibly moves to the checkbox

Spacebar: Activates on iOS and Android

Enter: Activates on Android.

The tests 430A, 440A, 450A can indicate keys to test specific operating systems and expected effects that depend on the operating system.

When the appropriate test includes the gesture test 440A, the test indicates a gesture and an effect caused by performing the gesture. For example, for testing the user interface element checkbox, the test indicates:

Swipe: Focus moves to the element, expresses its name, role, state

Doubletap: Checkbox toggles between checked and unchecked states.

When the appropriate test includes the audio test 450A, the test indicates audio and a function to be performed by the audio. For example, for testing the user interface element checkbox, the test indicates that the audio should include:

Name: Describes the purpose of the control and matches the visible label

Role: Identifies itself as a checkbox in Android and a Button in iOS

Group: Visible label is grouped with the checkbox in a single swipe

State: Expresses its state (disabled/dimmed, checked, not checked).

For both native applications and web programs, the group indicates to check that labels and controls are a single object to the user. For example, if the user element is a checkbox, tapping on the checkbox label should activate the checkbox rather than being forced to tap on the tiny checkbox.

The presentation 460 can be made human readable format or can be in a machine readable format because the testing can be performed automatically or manually. The indication 420 of the appropriate test can be editable to allow modification to the indicated tests 430A, 440A, 450A.

FIG. 4B shows selection of multiple appropriate tests. In FIG. 4B, both the checkbox 400 and the menu 410 have been selected. The processor appends the indication 420, 470 of the appropriate tests to create the presentation 460.

For testing the user interface element "menu," the keyboard test 430B indicates:

1. Test with the keyboard

Tab or arrow keys: Focus visibly moves, confined within the menu

Escape: The menu closes and returns focus to the button that launched it

Space: Any buttons or links are activated on iOS and Android

Enter: Any buttons or links are activated on Android.

When the appropriate test includes the gesture test 440B, the test indicates a gesture and an effect caused by performing the gesture. For testing the user interface element "menu," the gesture test 440B indicates:

Swipe: Focus moves, confined within the menu.

Doubletap: This typically activates most elements.

The gesture test 440B tests traversing and interacting with the screen for people who are blind and cannot see the screen. The gesture test can test that swiping across the screen moves the screenreader "focus" to different elements one by one.

When the appropriate test includes the audio test 450B, the test indicates audio and a function to be performed by the audio. For example, for testing the user interface element "menu," the audio test 450B indicates that the audio should include:

Name: Purpose of menu is clear.

Role: May identify itself as a menu, sidebar, or panel. Confining the user within the menu communicates the context to the screen reader user that there is a menu or modal present.

State: When open, other content is inert. Expands/collapses, closes/opens states are typically announced for a menu, sidebar, or panel.

The tests 430, 440, 450 can be written in a human readable format, and/or in a machine-readable format. The tests 430, 440, 450 can be performed manually or automatically. To perform an automated test, the processor can receive the indication of the appropriate tests 430, 440, 450 in either human readable format or in a machine readable format. Based on the indication of the appropriate tests 430, 440, 450, the processor can determine which tests to perform.

For example, if the test indicates an audio test 450A, 450B, the processor can execute the program under test, and the audio test for the particular element under test. In addition, the processor can play the audio associated with the particular element and perform natural language processing on the audio to determine the content of the audio and whether the content of the audio matches the particular element under test.

For example, if the element is a checkbox, the processor can determine whether the audio corresponds to the output specified in the "Name," "Role," "Group," and "State" requirements of the audio test 450A. In particular, to pass the "Name" component of the audio test 450A, the processor can determine whether the audio contains the specified output, namely whether the audio correctly states the name of the checkbox. To pass the "Role" component of the audio test 450A, the processor can determine whether the audio contains the specified output, namely whether the audio correctly states that the element under test is a checkbox in Android, or a button in iOS. To pass the "Group" component of the audio test 450A, the processor can determine whether the audio contains the specified output, namely whether the audio correctly states that the name of the element under test is grouped with the checkbox. To pass the "Group" component of the audio test 450A, the processor can also determine that tapping on the checkbox label activates the checkbox rather than being forced to tap on the tiny checkbox. Label and checkbox should act as a single unit. Finally, to pass the "State" component of the audio test 450A, the processor can determine whether the audio contains the specified output, namely whether the audio correctly states if the element under test is checked or unchecked. If the audio passes all four of the tests, the processor can determine that the program satisfies the audio test 450A. If the audio does not pass all four of the tests, the processor can indicate that the program has failed the audio test.

Figure 5:
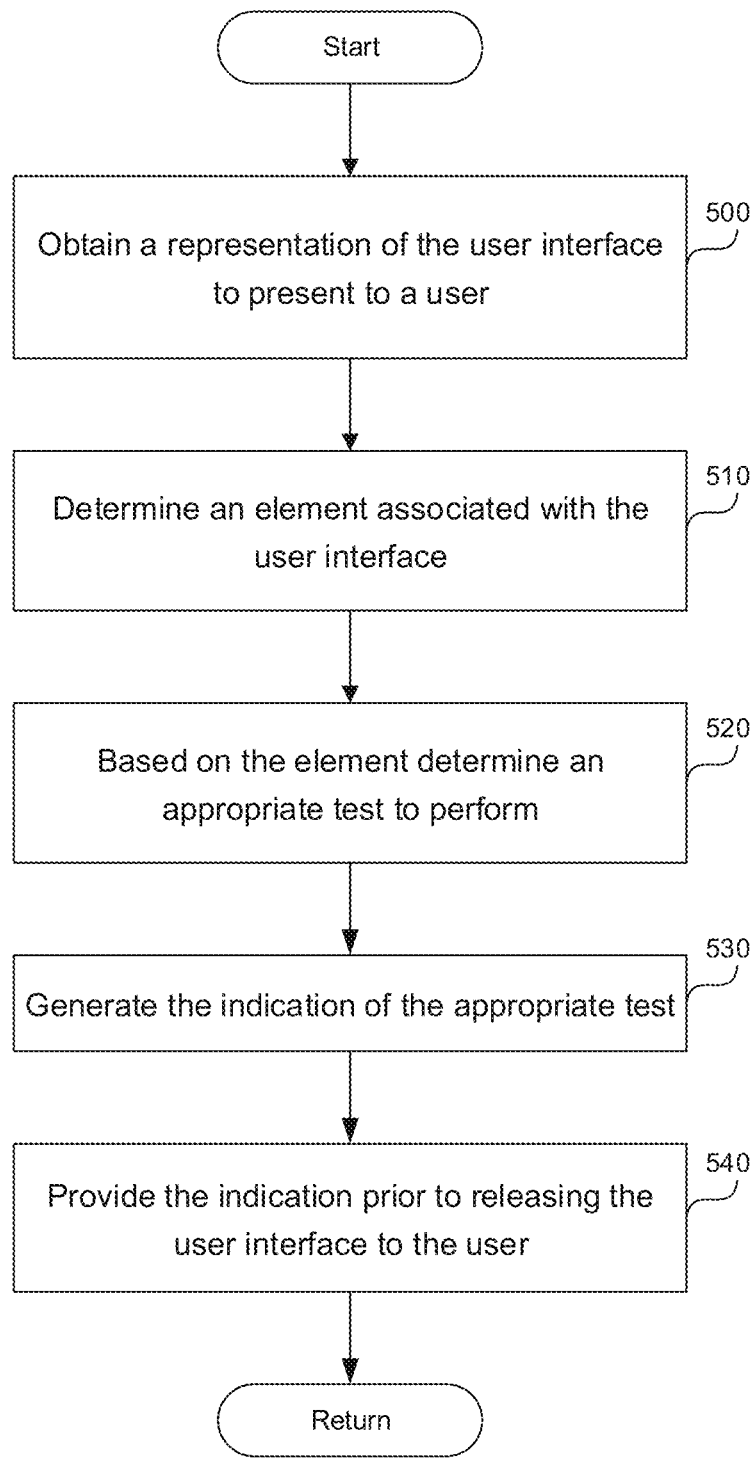
FIG. 5 is a flowchart that illustrates a process to generate an indication of an appropriate test to perform to ensure that a user interface provides intended information to a user.

FIG. 5 is a flowchart that illustrates a process to generate an indication of an appropriate test to perform to ensure that a user interface provides intended information to a user. In step 500, a hardware or software processor executing instructions described in this application can obtain a representation of the user interface to present to a user. The representation of the user interface can be a design describing the user interface, and/or a functioning user interface. The user interface can include a user interface, an audio user interface, and/or a haptic user interface.

In step 510, the processor can determine an element associated with the user interface such as a radio button, text input, capture, etc. The element is configured to provide information to the user, however, the user interface presentation of the element at least partially fails to provide the information to the user. For example, the user can be disabled and not be able to see and may need to interact with the user interface using audio or gestures when appropriate. The user may not be able to use the mouse and may need to interact with the user interface using a keyboard.

In step 520, based on the element, the processor can determine an appropriate test to perform. To accommodate various disabilities, the appropriate test can indicate a test to perform with a keyboard, a gesture test to perform with a mobile screen reader, and an audio test to perform with a screen reader.

In step 530, the processor can generate the indication of the appropriate test categorized by the type of test. When the appropriate test includes the test to perform with the keyboard, the appropriate test indication can include a keyboard key and an effect caused by activating the keyboard key. When the appropriate test includes the gesture test, the appropriate test indication can include a gesture and an effect caused by performing the gesture. When the appropriate test includes the audio test, the appropriate test indication can include audio and a function to be performed by the audio. The processor can provide the presentation prior to releasing the user interface to the user.

In step 540, the processor can provide the indication of the appropriate test prior to releasing the user interface to the user. The indication can be a presentation such as a multimedia presentation, text presentation, an audio presentation, a multimedia presentation, etc. The indication can be editable. Prior to releasing the user interface to the user, the processor can perform the appropriate test is performed on the user interface and can indicate when the user interface passed the appropriate test.

The processor can determine a type of program associated with the user interface. Based on the type of program, the processor can determine multiple categories associated with the user interface. The processor can determine a type of element by categorizing the element associated with the user interface into a category among the multiple categories. Finally, the processor can enable a selection of the appropriate test by presenting the multiple categories, the element, and the category associated with the element.

The user interface can be a web page. When the user interface is a web page, the processor can determine multiple categories associated with the user interface including at least four of: HTML, header, navigation, main, form, and footer. The processor can categorize the element associated with the user interface into a category among the multiple categories. The processor can enable a selection of the appropriate test by presenting the multiple categories, the element, and the category associated with the element. The selection can be performed by a user or automatically.

The user interface can be associated with a native application. When the user interface is associated with the native application, the processor can determine multiple categories associated with the user interface including controls and notifications. The processor can categorize the element associated with the user interface into a category among the multiple categories. The processor can enable a selection of the appropriate test by presenting the multiple categories, the element, and the category associated with the element. As mentioned above, the selection can be performed by a user or automatically.

The processor can test the performance of the program. The processor can obtain a program associated with the user interface and the indication of the appropriate test, where the appropriate test includes the audio test. The processor can execute the program associated with the user interface and the audio test. The processor can perform natural language processing on the audio test to determine whether the audio test corresponds to an output indicated in the appropriate test. Upon determining that the audio test does not correspond to the output indicating the appropriate test, the processor can indicate that the program did not pass the test.

Computer System

Figure 6:
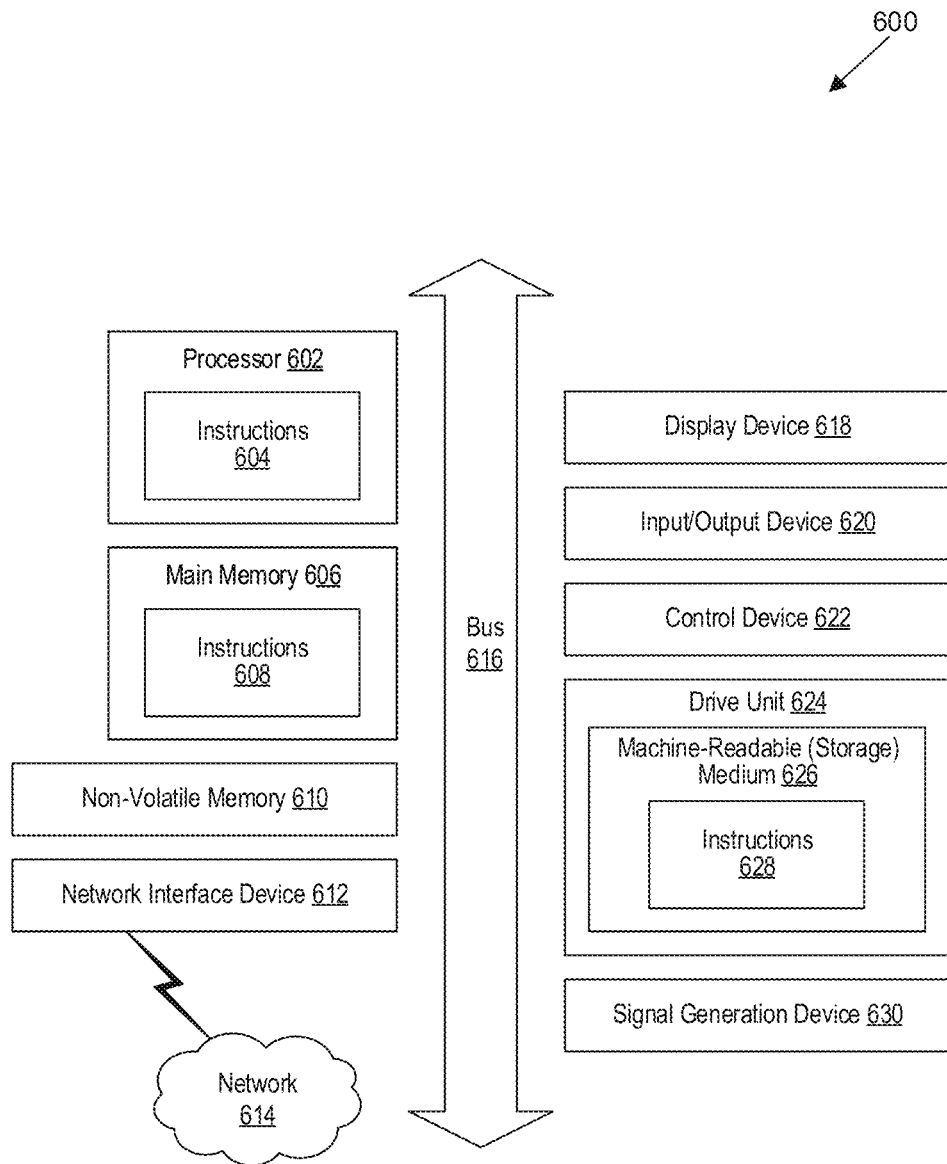
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. A computer-readable storage medium, excluding transitory signals and carrying instructions to generate an indication user interface of an appropriate test to perform to ensure that a user interface provides intended information to a user, which, when executed by at least one data processor of a system, causes the system to:
    obtain a representation of the user interface to present to the user;
    determine an element associated with the user interface,
        wherein the element is configured to provide information to the user,
        wherein a user interface presentation of the element at least partially fails to provide the information to the user;
    based on the element, determine the appropriate test to perform,
        wherein the appropriate test indicates a test to perform with a keyboard, a gesture test to perform with a mobile screen reader, and an audio test to perform with a screen reader;
    generate the indication user interface of the appropriate test by:
    indicating a keyboard key and an effect caused by activating the keyboard key when the appropriate test includes the test to perform with the keyboard;
    indicating a gesture and an effect caused by performing the gesture when the appropriate test includes the gesture test; and
    indicating an audio and a function to be performed by the audio when the appropriate test includes the audio test,
        wherein the audio test includes a group, and a state,
            wherein the group indicates to check whether selecting a visible label associated with the element selects the element, and
            wherein the state indicates to check whether the audio correctly describes a selection state associated with the element including selected and unselected; and
    provide the indication user interface of the appropriate test prior to releasing the user interface to the user,
        wherein prior to releasing the user interface to the user, the appropriate test is performed on the user interface and the user interface passed the appropriate test.

2. The computer-readable storage medium of claim 1, comprising instructions to:
    determine a type of program associated with the user interface, wherein the user interface is a user interface for a mobile phone and wherein the program is a program to run on the mobile phone;
    based on the type of program, determine multiple categories associated with the user interface;
    categorize the element associated with the user interface into a category among the multiple categories; and
    enable a selection of the appropriate test by presenting the multiple categories, the element, and the category associated with the element.

3. The computer-readable storage medium of claim 1, wherein the user interface is associated with a web page, and comprising instructions to:
    determine multiple categories associated with the user interface including at least four of: HTML, header, navigation, main, form, and footer;
    categorize the element associated with the user interface into a category among the multiple categories; and
    enable a selection of the appropriate test by presenting the multiple categories, the element, and the category associated with the element.

4. The computer-readable storage medium of claim 1, wherein the user interface is associated with an application, and comprising instructions to:
    determine multiple categories associated with the user interface including controls and notifications;
    categorize the element associated with the user interface into a category among the multiple categories; and
    enable a selection of the appropriate test by presenting the multiple categories, the element, and the category associated with the element.

5. The computer-readable storage medium of claim 1, wherein the user interface includes a graphical user interface, an audio user interface, or a haptic user interface.

6. The computer-readable storage medium of claim 1, comprising:
    obtain a program associated with the user interface and the indication of the appropriate test,
        wherein the appropriate test includes the audio test;
    execute the program associated with the user interface and the audio test;
    perform natural language processing on the audio test to determine whether the audio test corresponds to an output indicated in the appropriate test; and
    upon determining that the audio test does not correspond to the output indicating the appropriate test, indicate that the program did not pass the test.

7. A system comprising:
    at least one hardware processor; and
    at least one non-transitory memory storing instructions, which, when executed by the at least one hardware processor, cause the system to:
    obtain a representation of the user interface to present to the user;
    determine an element associated with the user interface,
        wherein the element is configured to provide information to the user,
        wherein a user interface presentation of the element at least partially fails to provide the information to the user;
    based on the element, determine the appropriate test to perform,
        wherein the appropriate test indicates a test to perform with a keyboard, a gesture test to perform with a mobile screen reader, and an audio test to perform with a screen reader;
    generate an indication user interface of the appropriate test by:
    indicating a keyboard key and an effect caused by activating the keyboard key when the appropriate test includes the test to perform with the keyboard;
    indicating a gesture and an effect caused by performing the gesture when the appropriate test includes the gesture test; and
    indicating an audio and a function to be performed by the audio when the appropriate test includes the audio test,
        wherein the audio test includes a group, and a state,
            wherein the group indicates to check whether selecting a visible label associated with the element selects the element, and wherein the state indicates to check whether the audio correctly describes a selection state associated with the element including selected and unselected; and
provide the indication user interface of the appropriate test prior to releasing the user interface to the user; and
perform the appropriate test on the user interface;
determine whether the user interface passed the appropriate test; and
upon determining that the user interface passed the appropriate test, indicate that the user interface is ready for release.

8. The system of claim 7, comprising instructions to:
determine a type of program associated with the user interface;
based on the type of program, determine multiple categories associated with the user interface;
categorize the element associated with the user interface into a category among the multiple categories; and
enable a selection of the appropriate test by presenting the multiple categories, the element, and the category associated with the element.

9. The system of claim 7, wherein the user interface is associated with a web page, comprising instructions to:
determine multiple categories associated with the user interface including at least four of: HTML, header, navigation, main, form, and footer;
categorize the element associated with the user interface into a category among the multiple categories; and
enable a selection of the appropriate test by presenting the multiple categories, the element, and the category associated with the element.

10. The system of claim 7, wherein the user interface is associated with an application, comprising instructions to:
determine multiple categories associated with the user interface including controls and notifications;
categorize the element associated with the user interface into a category among the multiple categories; and
enable a selection of the appropriate test by presenting the multiple categories, the element, and the category associated with the element.

11. The system of claim 7, wherein the user interface includes a graphical user interface, an audio user interface, or a haptic user interface.

12. The system of claim 7, comprising instructions to:
obtain a program associated with the user interface and the indication of the appropriate test,
wherein the appropriate test includes the audio test;
execute the program associated with the user interface and the audio test;
perform natural language processing on the audio test to determine whether the audio test corresponds to an output indicated in the appropriate test; and
upon determining that the audio test does not correspond to the output indicating the appropriate test, indicate that the program did not pass the test.

13. A method comprising:
identifying an element associated with a user interface,
wherein the element is configured to provide information to a user,
wherein a user interface presentation of the element at least partially fails to provide the information to the user;
determining a type of element associated with the user interface;
based on the type of element, determining an appropriate test to perform,
wherein the appropriate test indicates at least two of:
a test to perform with a keyboard, a gesture test to perform with a mobile screen reader, and an audio test to perform with a screen reader;
generating an indication user interface of the appropriate test by:
indicating a keyboard key and an effect caused by activating the keyboard key when the appropriate test includes the test to perform with the keyboard;
indicating a gesture and an effect caused by performing the gesture when the appropriate test includes the gesture test; and
indicating an audio and a function to be performed by the audio when the appropriate test includes the audio test,
wherein the audio test includes a group, and a state,
wherein the group indicates to check whether selecting a visible label associated with the element selects the element, and
wherein the state indicates to check whether the audio correctly describes a selection state associated with the element including selected and unselected; and
providing the indication user interface of the appropriate test prior to releasing the user interface to the user; and
performing the appropriate test on the user interface;
determining whether the user interface passed the appropriate test; and
upon determining that the user interface passed the appropriate test, indicating that the user interface is ready for release.

14. The method of claim 13, comprising:
determining a type of program associated with the user interface;
based on the type of program, determining multiple categories associated with the user interface;
categorizing the element associated with the user interface into a category among the multiple categories; and
enabling a selection of the appropriate test by presenting the multiple categories, the element, and the category associated with the element.

15. The method of claim 13, wherein the user interface is associated with a web page, the method comprising:
determining multiple categories associated with the user interface including at least four of: HTML, header, navigation, main, form, and footer;
categorizing the element associated with the user interface into a category among the multiple categories; and
enabling a selection of the appropriate test by presenting the multiple categories, the element, and the category associated with the element.

16. The method of claim 13, wherein the user interface is associated with an application, the method comprising:
determining multiple categories associated with the user interface including controls and notifications;
categorizing the element associated with the user interface into a category among the multiple categories; and
enabling a selection of the appropriate test by presenting the multiple categories, the element, and the category associated with the element.

17. The method of claim 13, wherein the user interface includes a graphical user interface, an audio user interface, or a haptic user interface.

18. The method of claim 13, comprising:
obtaining a program associated with the user interface and the indication of the appropriate test,
wherein the appropriate test includes the audio test;
executing the program associated with the user interface and the audio test;

performing natural language processing on the audio test to determine whether the audio test corresponds to an output indicated in the appropriate test; and upon determining that the audio test does not correspond to the output indicating the appropriate test, indicating that the program did not pass the test.

\* \* \* \* \*